No. 864,144. PATENTED AUG. 27, 1907.
E. B. ALLEN.
BUTTONHOLE STITCHING MACHINE.
APPLICATION FILED MAR. 7, 1906.

No. 864,144. PATENTED AUG. 27, 1907.
E. B. ALLEN.
BUTTONHOLE STITCHING MACHINE.
APPLICATION FILED MAR. 7, 1906.

Witnesses:  Inventor:
  Edward B. Allen,
By his Attorney

No. 864,144. PATENTED AUG. 27, 1907.
E. B. ALLEN.
BUTTONHOLE STITCHING MACHINE.
APPLICATION FILED MAR. 7, 1906.

Witnesses:
Inventor:
Edward B. Allen
By his Attorney

No. 864,144.

PATENTED AUG. 27, 1907.

E. B. ALLEN.
BUTTONHOLE STITCHING MACHINE.
APPLICATION FILED MAR. 7, 1906.

No. 864,144. PATENTED AUG. 27, 1907.
E. B. ALLEN.
BUTTONHOLE STITCHING MACHINE.
APPLICATION FILED MAR. 7, 1906.
12 SHEETS—SHEET 9.

Fig. 20.

Witnesses: Inventor:
By his Attorney

No. 864,144. PATENTED AUG. 27, 1907.
E. B. ALLEN.
BUTTONHOLE STITCHING MACHINE.
APPLICATION FILED MAR. 7, 1906.
12 SHEETS—SHEET 11.

No. 864,144. PATENTED AUG. 27, 1907.
E. B. ALLEN.
BUTTONHOLE STITCHING MACHINE.
APPLICATION FILED MAR. 7, 1906.
12 SHEETS—SHEET 12.

Witnesses: Inventor:

UNITED STATES PATENT OFFICE.

EDWARD B. ALLEN, OF ELIZABETH, NEW JERSEY, ASSIGNOR TO THE SINGER MANUFACTURING COMPANY, A CORPORATION OF NEW JERSEY.

BUTTONHOLE-STITCHING MACHINE.

No. 864,144.        Specification of Letters Patent.        Patented Aug. 27, 1907.

Application filed March 7, 1906. Serial No. 304,732.

*To all whom it may concern:*

Be it known that I, EDWARD B. ALLEN, a citizen of the United States, residing at Elizabeth, in the county of Union and State of New Jersey, have invented or discovered certain new and useful Improvements in Buttonhole-Stitching Machines, of which the following is a specification, reference being had therein to the accompanying drawings.

This invention relates to that class of button-hole stitching machines more particularly adapted for working eyed button-holes and in which the stitch-forming devices are mounted for periodical rotation, for the purpose of working the eye-portions of the button-holes; although some features of the invention may be embodied in other kinds of button-hole machines; the invention having for its object to provide a button-hole cutting and stitching machine which is comparatively simple in construction and which is adapted to be run at high speeds with an expenditure of comparatively little power.

To this end the present improved machine comprises a stationary frame on which the stitch-forming devices are mounted for periodical rotation and relative to which stitch-forming devices the work-clamp is fed or caused to travel lengthwise of the button-holes beneath the needles, for properly spacing the stitches; the said work-clamp being mounted on pivoted arms so as to be adapted to be swung laterally in working portions of the eyes of the button-holes and in barring the button-holes.

Also the present improved machine comprises an automatic button-hole cutting device which, when a button-hole is to be cut, is automatically coupled to a continuously moving lever or part and which is so operated that the cutter is advanced to the work, the button-hole is cut and the cutter is then instantly retracted and automatically uncoupled from its operating device; after which the stitching mechanism is automatically set into operation to stitch and bar a button-hole; and when the working of a button-hole has been completed the machine is automatically stopped, as will be hereinafter fully set forth.

In the accompanying drawings.

Referring to the drawings, 12 denotes the base of the machine and 13 the bracket-arm surmounting said base, said parts constituting the stationary frame of the machine on which the stitch-forming devices are preferably rotatively mounted, so as to be adapted to be turned, and on which the work-supporting and button-hole cutting devices are movably mounted. Journaled in the said base 12 is the main or driving shaft 14 on which is loosely mounted the driving pulley 15 having a suitable clutch connection with said shaft. Rotating with said pulley, and preferably formed on the hub of the latter, is a pinion 16 meshing with a gear cam-wheel 17 provided on its inner face with a cam-groove 18 entered by a stud 19 on a cutter-operating lever 20, so that said lever is in constant vibration when the machine is running.

The driving shaft 14 is constructed with twin quartering cranks 21 connected by pitmen 22 with similar cranks 23 on the rotating needle-bar shaft 24 journaled in the upper part of the arm and provided at its forward end with cranks connected by pitmen with two out-of-time needle-bars 25 carrying needles 26; said needle-bars being operated in the manner fully set forth in U. S. Patent No. 739,132, granted Sept. 15, 1903. The needle-bars 25 reciprocate vertically in a rotatable guide 27 suitably mounted in the head of the machine, as fully set forth in U. S. Patent No. 734,794, granted July 28, 1903, and said guide is provided with a pinion 28 by which it may be rotated.

The loop-taking devices coöperating with the needles 26 are operatively connected with the forward end of the shaft 14 and are preferably the same in construction and operation as the loop-taking devices fully shown and described in said U. S. Patent No. 734,794, said loop-taking devices being mounted on a rotatable carrier 29 provided with a pinion 30 by which it may be turned.

Figure 19:
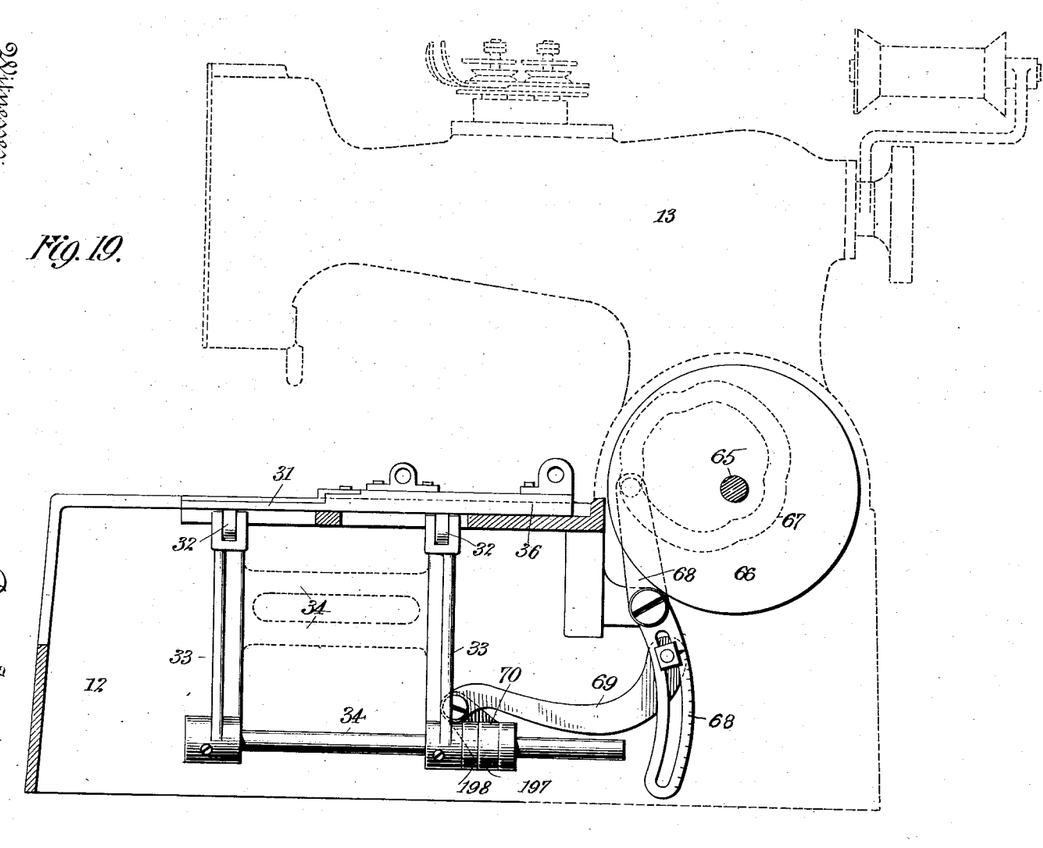
Fig. 19 is a sectional elevation illustrative of the feeding mechanism.

The work-support comprises a plate or table 31 having depending ears 32 by which it is jointed to the upper ends of swinging arms 33 attached to sliding rods 34 longitudinally movable in lugs or supports 35ᵃ on the base 12. In practice the arms 33 on each side of the work-supporting frame will preferably be connected by one or more longitudinal bars 34, as shown in dotted lines in Fig. 19, to strengthen and steady the said work-supporting frame. The lower clamp-plates 35 are attached to plates 36 mounted on the table 31 and adapted to be moved laterally towards and from each other in a well-known manner, by any suitable means, for the purpose of spreading the work after a button-hole has been cut. The upper-clamping plates or clamping feet 37 are carried at the forward ends of clamp-arms 38 attached to rocking blocks 39 pivotally mounted on plates or blocks 40 secured to the plates 36. Journaled in suitable bearings at the rear ends of the plates 36 is a rock-shaft 40ᵃ provided with cams 41 against which blocks 42 at the rear ends of the clamp arms 38 are pressed by the stress of torsional springs 43 at the pivots of said arms; said springs thus serving to open the clamp by lifting the forward ends of said clamp arms when the clamp-closing cams on the rock-shaft 40 are in such position as to permit the clamping-plates or feet 37 to be lifted by said springs. The said shaft 40 is also provided with a small arm or tappet 44 to engage a clamp-spreader operating-plate 45, which, however, forms no part of the present invention.

The rock-shaft 40ᵃ is provided at one end with an arm 46 to be connected by a rod 47 with a suitable heel-and-toe treadle for the purpose of turning the said rock-shaft to close and open the clamp; and at the other end of said rock-shaft is another arm 48 to which is jointed the forward end of a bar 49 passing through an opening in a steadying and guiding bracket 50 secured to the base of the machine. The rear end of the bar 49 is held yieldingly downward by a spring 51, and said bar is provided on its underside with a shoulder 52 for engagement with one arm of a tripping lever 53 the other arm of which, when the machine is running, is engaged by a retaining hooked arm 54 of a starting-lever 55 by which the machine may be set into operation, as will be hereinafter described.

The main shaft 14 is provided with a grooved cam 56 entered by a stud 57 on an arm 58 of a rocker 59, said rocker having a second arm 60 to which is adjustably connected one end of a link 61 the other end of which is preferably adjustably attached to a vibrating arm 62 for operating clutch-dogs 63 which impart an intermittent rotation, in a well-known manner, to a wheel 64 fixed to a feed shaft 65 from which the longitudinal feeding movements and the lateral movements of the work-clamp, as also the rotating or turning movements of the stitch-forming devices are derived. The adjustable connections of the link 61 with the arms 60 and 62 provide for a wide variation of the feed so that the button-hole stitches may be more or less closely spaced, as may be desirable for different kinds of work. The said shaft 65 carries a fixed cam-wheel 66 provided with a grooved cam 67 entered by a stud at the upper end of a feed-lever 68 to which is adjustably attached one end of a link or pitman 69 the other end of which is jointed to a lug or projection on a cross-bar 70 connected with the rods 34 forming part of the work-supporting frame; so that as the said lever 68 is vibrated the said frame and the work-clamp mounted thereon will be fed back and forth, lengthwise of the button-holes, beneath the needles of the machine. The lower arm of the feed-lever 68 to which the link 69 is adjustably attached is of sufficient length to provide for a wide adjustment of the lengthwise traveling movements of the work-clamp so that button-holes of varying lengths, from very short to very long, may be stitched on the improved machine. Also fixed to said shaft 65 is a cam-cylinder 71 having a peripheral cam-groove entered by a pin or stud at the rear end of a lever 72 carrying at its forward end a second pin or stud 73 entering a groove in an arm 74 rigid with the table 31 so as to swing the said table and the work-clamp carried thereby laterally when portions of the eyes of the button-holes are being stitched and also in barring said button-holes, such barring being effected at the reverse rotations of the stitch-forming devices, in much the same manner as in the machine of Patent No. 734,794, hereinbefore referred to, excepting that in the present improved machine the work preferably has slight movements, lengthwise of the button-holes, during the barring operations, for the purpose of forming straight crossing-stitch bars as shown in U. S. Patent No. 735,433, granted Aug. 4, 1903, rather than the radial-stitch bars of said Patent No. 734,794.

The feed-shaft 65 also carries a cam-wheel 75 having a cam-groove 76 entered by a pin or stud 77 on a vertical bar 78 to which are attached the sliding rods 79 and 80 which are connected, respectively, with the upper and lower racks 81 and 82 meshing, respectively, with the pinions 28 and 30 by means of which the needles and loopers are rotated in stitching portions of the eyes of the button-holes and in barring. The pin or stud 77 is preferably located in the middle of the length of the vertical bar 78, or about midway between the rods 79 and 80, so that parallel, equal and steady sliding movements, without tendency to bind, will be imparted to the said rods 79 and 80 secured to the opposite ends of said bar; and owing to the fact that the said pin or stud 77 fits closely in said cam groove 76 the racks 81 and 82 will be positively operated in both directions and the turning movements of the stitching devices will always be positively controlled and steadied by the said cam-groove with which they are connected and from which they are operated.

Figure 1:
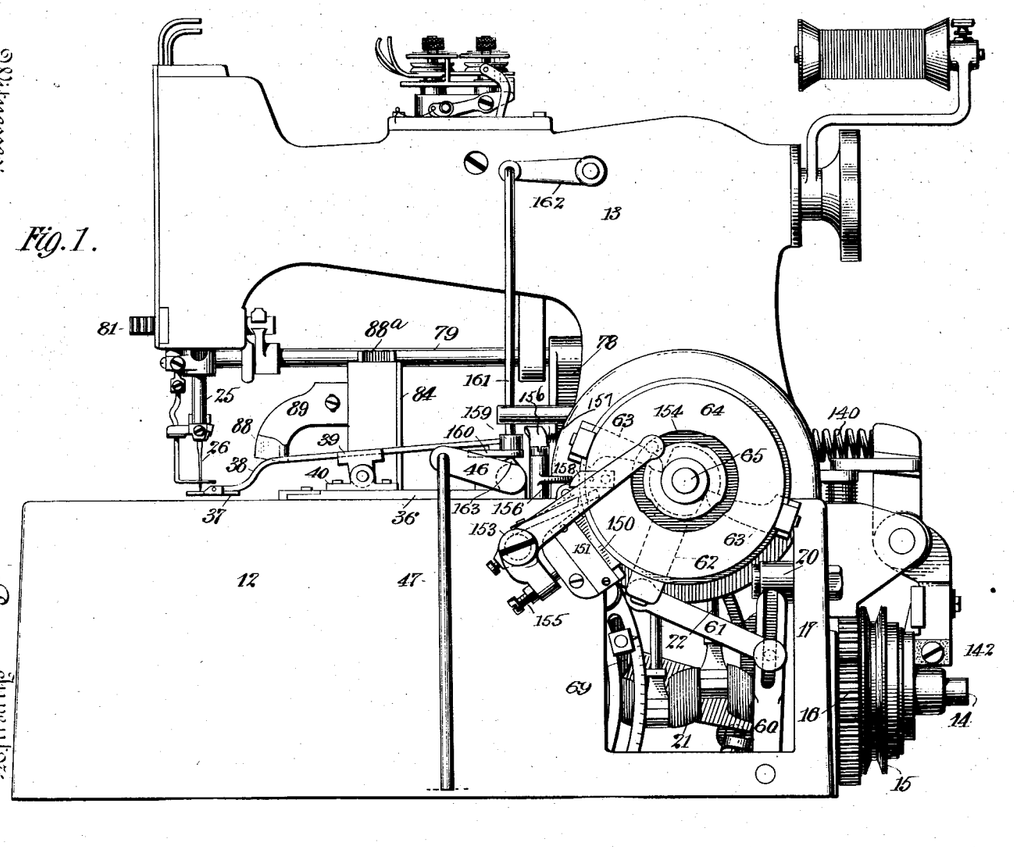
Figure 1 is a side view of a machine embodying the invention.
Figures 2, 3, 4, 5:
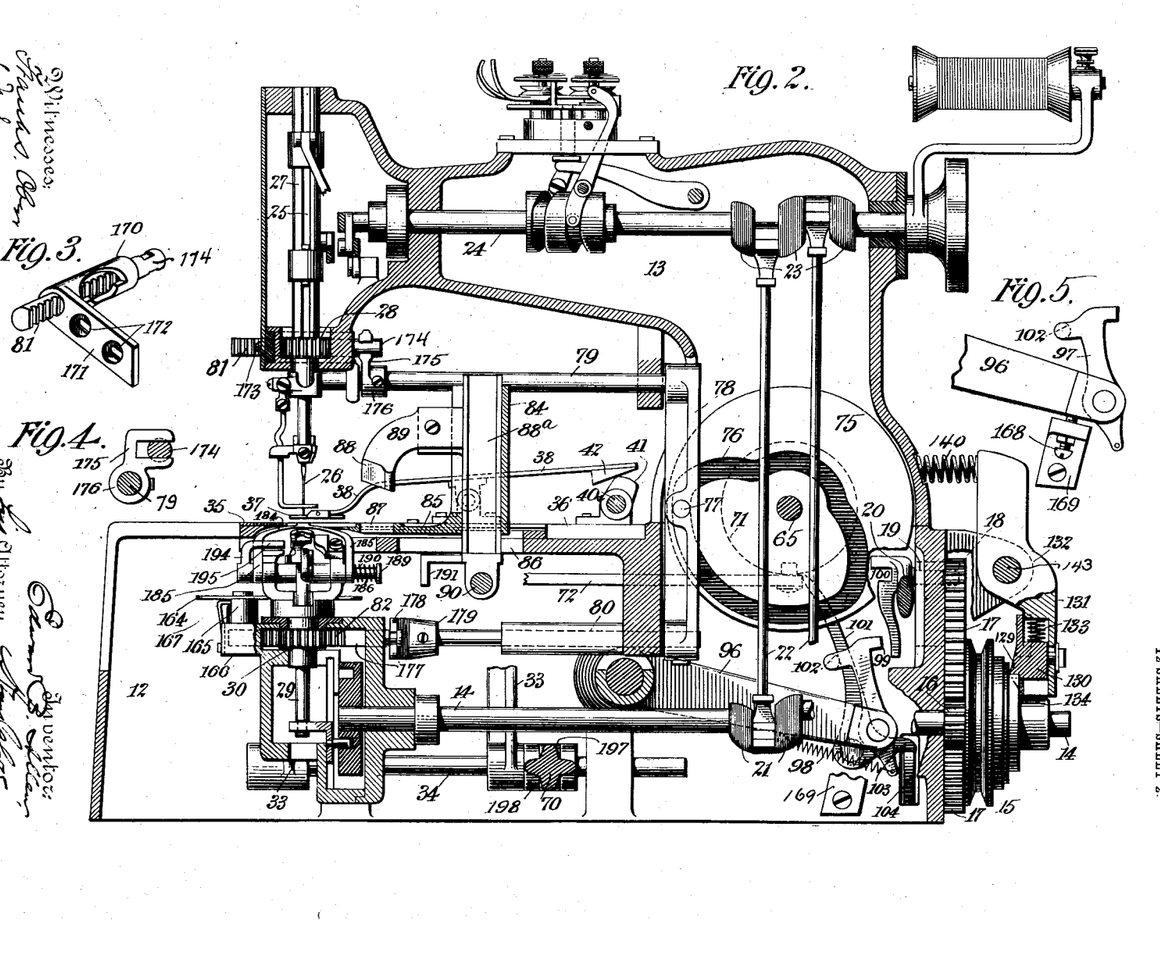
Fig. 2 is a vertical longitudinal section of the same.
Figs. 3 and 4 are detail views of parts of the needle-turning mechanism.
Fig. 5 is a detail view of a part of the button-hole cutting mechanism.
Figure 6:
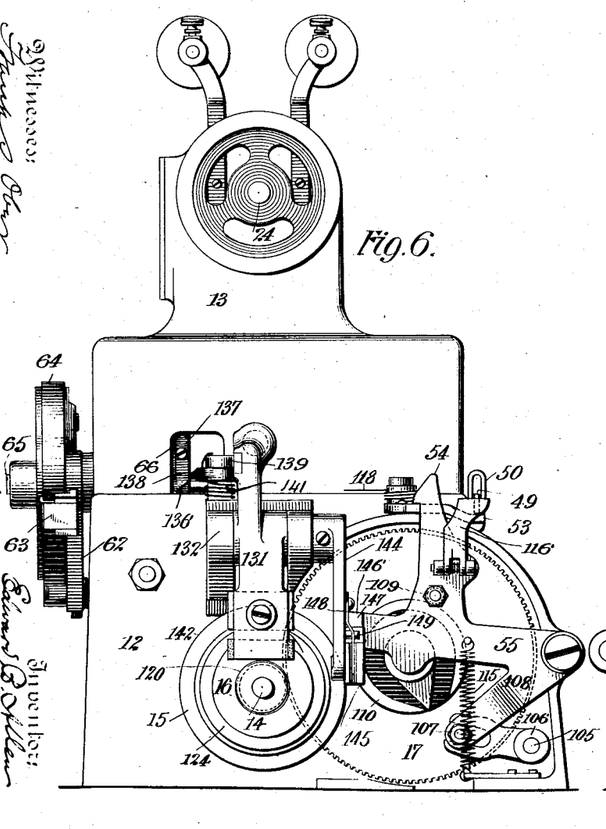
Fig. 6 is a rear end view of the machine.
Figure 7:
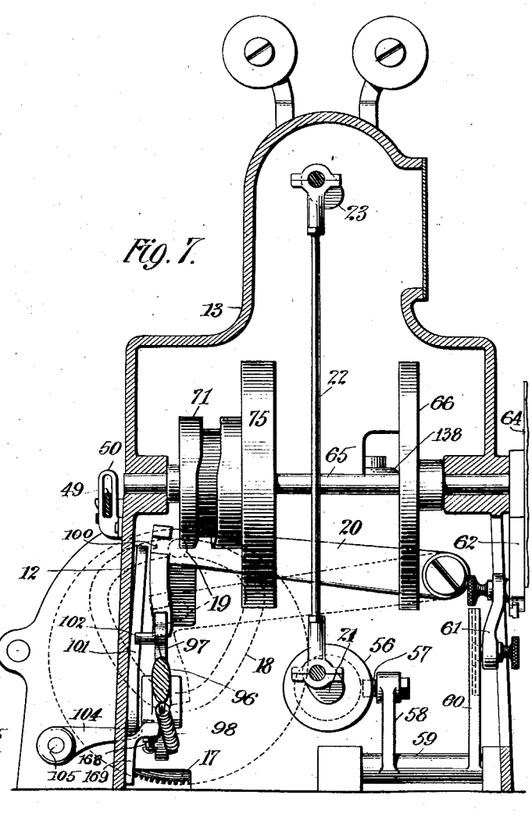
Fig. 7 is a transverse sectional view in the line of the feed-shaft, looking towards the rear end of the machine.
Figures 21, 22, 23:
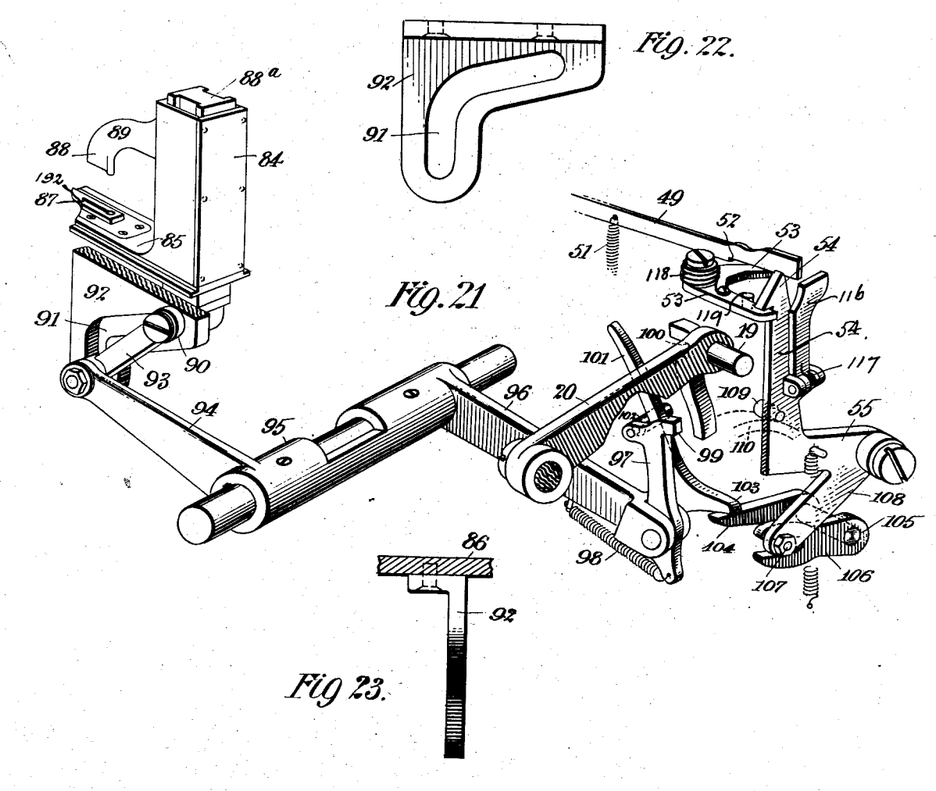
Fig. 21 is a detail perspective illustrative of the cutting mechanism and its starting and stopping controlling-means.
Figs. 22 and 23 are detail views of the stationary cutter-controlling cam-plate.
Figures 24, 25, 26, 27, 28:
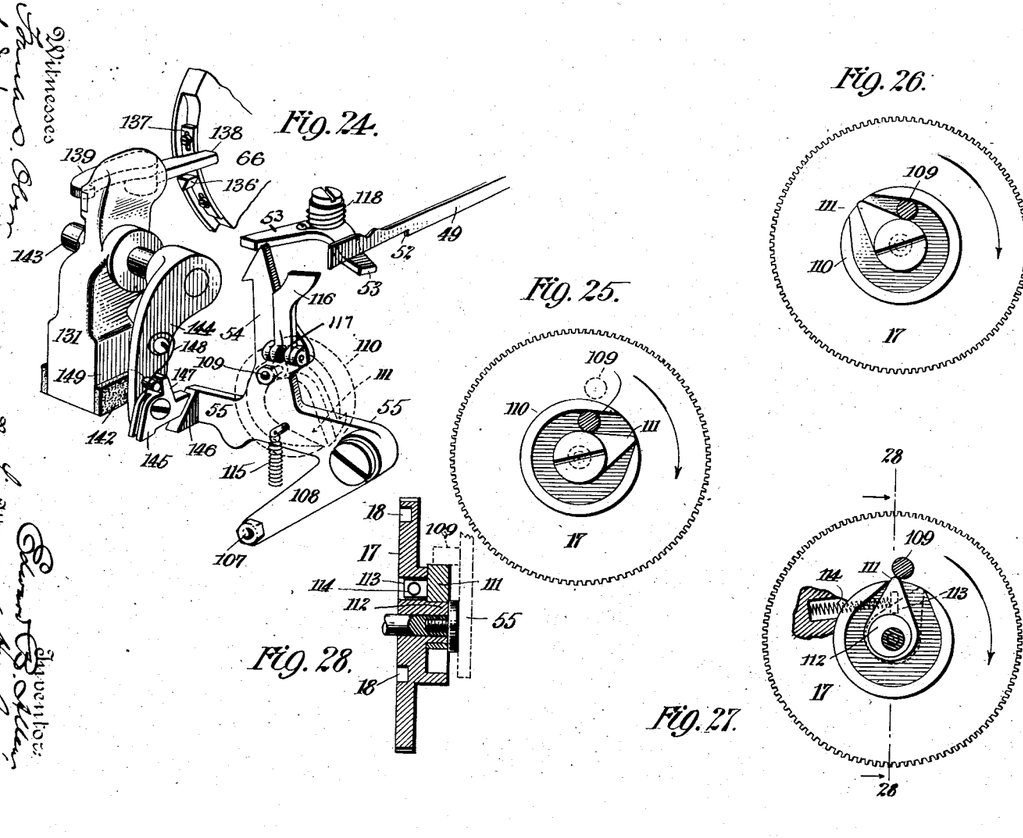
Fig. 24 is a detail perspective view of the starting and stopping mechanism.
Figs. 25, 26, 27 and 28 are detail views of the cutter actuating cam-device, Fig. 28 being a section on line 28—28, Fig. 27.

The work-supporting plate or table 31 has a central opening 83 to admit to its proper position the button-hole cutting device, which is similar in construction to that of U. S. Patent No. 736,471, granted Aug. 18, 1903, in that said cutting device comprises rigidly connected upper and lower cutting members movable together into and out of cutting position. The present cutting device comprises a hollow post or standard 84 having a base or foot-plate 85 mounted to slide toward and from the needles in a suitable guideway formed on or in the fixed bed-plate 86 of the machine base 12; said base or foot-plate 85 being provided with or constructed to form a throat or die 87 forming the lower cutting member and adapted to be entered by a knife or cutter 88 formed on an arm 89 rigid with the cutter-bar 88ª which reciprocates vertically in the post or standard 84. The said cutter-bar carries at its lower end a stud 90 entering a guide-slot 91 formed in a plate 92 rigidly fixed relative to the bed-plate 86; said stud being connected by a link 93 with the forward arm 94 of a rocker 95 supported by the machine base 12 and having a rearwardly-extending operating-arm 96. A coupling-lever 97 is pivotally mounted in the rear end of the arm 96 and a spring 98 attached to the lower arm of said lever 97 normally tends to force a tooth or projection 99 at the upper end of said lever towards a notch 100 formed for its reception in the constantly vibrating cutter-operating lever 20 hereinbefore referred to. During the time, however, when the stitch-forming and feeding mechanism of the machine is running the said coupling-lever 97 is held in an idle position away from the constantly vibrating operating lever 20, by a detent-lever 101 which engages a pin 102 carried by said coupling-lever. The toe 103 of the said detent-lever rests on an arm 104 attached to a rock-shaft 105 mounted in the machine base and having a second arm 106 slotted or forked to receive a pin or stud 107 carried by an arm 108 of the starting-lever 55. The starting-lever 55 is provided with a stud 109 which, when the machine is running and when the hooked arm 54 of said starting lever is in engagement with the tripping lever 53, as shown in Figs. 6 and 21, will be above and entirely clear of the hub 110 formed on the constantly-running gear cam-wheel 17. The hub 110 is provided with a recess having a mouth which is open to one part of the periphery of said hub, said recess being for the reception of a switch-tappet 111 pivotally mounted on an eccentric sleeve 112 with which said wheel 17 is provided, the space around said switch-tappet, within said hub, affording a cam-track adapted to receive said stud 109. The switch-tappet 111 is provided at its inner side with a lug 113 against which presses a spring 114, housed within the wheel 17, to normally hold said switch-tappet in the position shown in Figs. 6 and 25; but when the tripping lever 53 is disengaged from the hooked arm 54 of the starting lever 55 the said starting lever will be drawn down by the spring 115 to bring the stud 109 into contact with the periphery of the hub 110; and as the wheel 17 is constantly rotating in the direction denoted by the arrow in Figs. 25, 26 and 27 said stud will now enter the track outside of the switch-tappet, as denoted in full lines in Fig. 25, lowering the starting lever 55 to the position shown in Fig. 24. The continued rotation of the wheel 17 brings the parts to the positions shown in Figs. 26 and 27, and as the switch-tappet 111 engages the stud 109, as in Fig. 26, the said switch-tappet will lift the said stud clear of the hub 110 and in so doing said switch-tappet will yield against the stress of the spring 115 and eject the said stud from the open mouth in the cam-track in the said hub 110. See Fig. 27. This lifting movement of the said stud raises said starting lever 55 to the position shown in Figs. 6 and 21, thereby starting the machine, as will be hereinafter described. When, however, the starting lever 55 is moved downward, as above described, it moves the rock-shaft 105 so that the arm 104 thereof is depressed to release the detent lever 101, thus permitting the coupling-lever 97 to be moved by the spring 98 into position to engage the projection 99 of said coupling lever with the notch 100 of the constantly-vibrating cutter-operating lever 20; thereby connecting the rocker 95 with the operating lever 20 and causing the cutter to make a forward and downward cutting movement, and then a return upward and backward movement to its first position, during a single rotation of the wheel 17. The upward movement of the lever 55 oscillates the rock-shaft 105 and the detent-lever 101; thereby causing the coupling-lever to be disengaged from its operating lever, after a single rotation of the wheel 17, in the manner above described.

From the foregoing it will be understood that the operation of closing the clamp operates the tripping-lever 53 so as to release the starting lever 55; and although, incidentally, this release of the starting lever results in coupling the cutting device with its constantly-vibrating operating-lever, such starting of the machine would result from the movement of the tripping-lever to release the starting-lever, whether the cutting operation is intermediately performed or not.

Figures 8, 9:
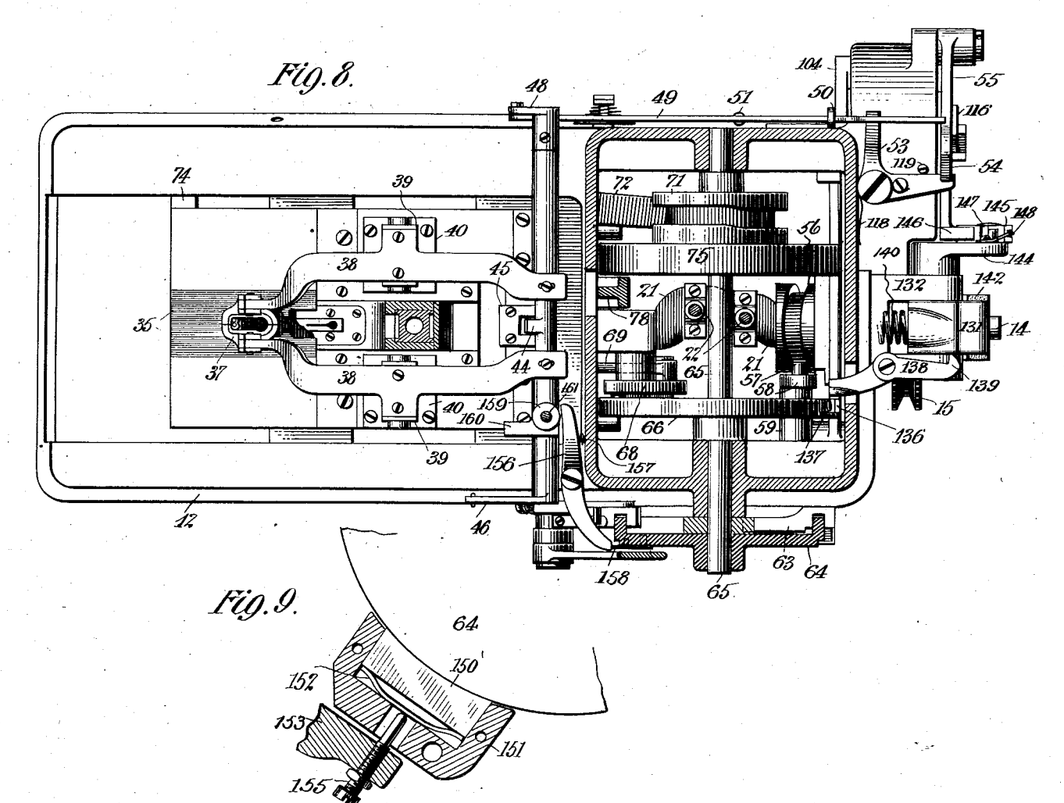
Fig. 8 is a horizontal sectional view in the line of the feed-shaft, looking down.
Fig. 9 is a detail view to show the frictional feed-controlling device.
Figure 10:
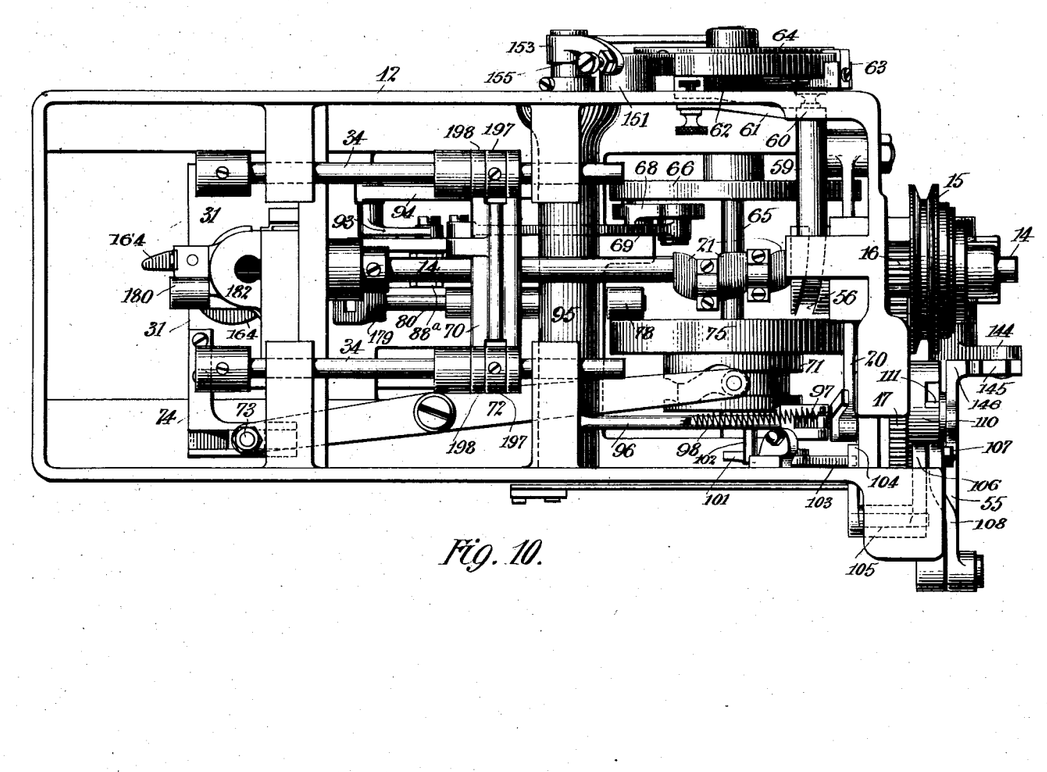
Fig. 10 is a bottom view of the machine.
Figure 20:
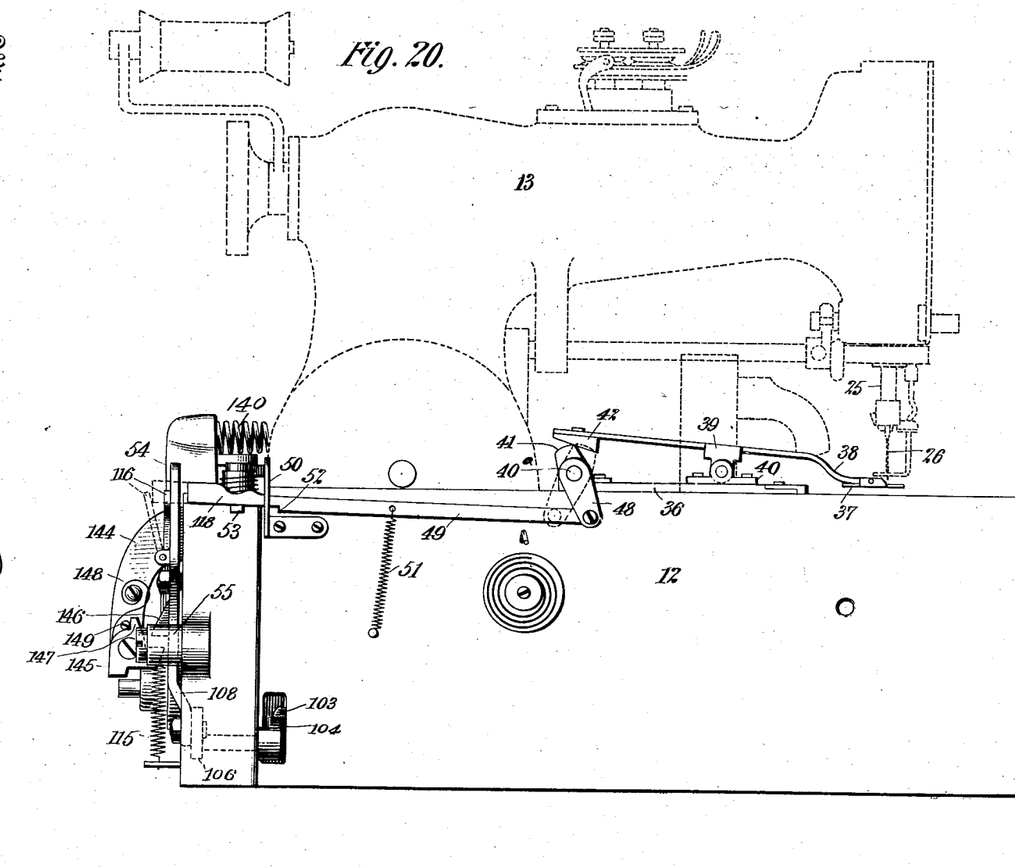
Fig. 20 is a side view of the machine, opposite to Fig. 1 and partly in dotted lines, illustrative of the starting and stopping mechanism.

For the purpose of releasing the tripping-lever 53 from the shoulder 52 of the tripping-bar 49, so that the said lever will be in a position to be engaged by the hooked arm 54 of the starting-lever 55 when said lever is lifted by the switch-tappet 111, as above described, the said arm 54 is provided with a spring-pressed lifting latch 116 the top of which is above the bottom of the rear end of the said tripping-bar when the shoulder 52 on said bar is in engagement with the said tripping-lever. Thus as the said tripping-bar is moved rearward, when the work-clamp is closed, the rear end of said bar abuts against said latch and forces the same outward to the position shown in dotted lines in Fig. 20; but when the starting lever is moved downward, as above described, the said latch is returned by its spring 117 to its normal position relative to the hooked arm 54 by which it is carried; and when in such normal position said latch will be beneath the rear end of said tripping-bar when the starting lever is lowered. From this construction and arrangement of parts it results that when the starting lever is performing its upward or machine-starting movement, as will presently be described, the latch 116 will lift the rear end of the said tripping-bar so as to disengage the latter from the said tripping-lever and so that the said lever will then be instantly returned, by the torsional spring 118, to its normal position with one arm in engagement with the stop-pin 119; and at the last part of the upward movement of the starting-lever the incline at the top of the hooked arm 54 rides past the retaining arm of the spring-pressed tripping-lever so that the said retaining arm will now snap beneath the shoulder of the hook and thereby lock the starting lever in its raised position. It will thus be understood that after a single vibration of the starting-lever the latter will be locked to prevent a second vibration thereof until said lever is next tripped by the opening of the clamp; and as said starting-lever controls the cutting mechanism a second operation of the cutter cannot occur until the starting-lever is again operated. When the work-clamp is opened to release the work, after a button-hole has been completed, the tripping-bar 54 is moved forward to the position shown in Figs. 8 and 20, and in full lines in Fig. 21, and being thus disengaged from the lifting latch 116 said bar will be in position to perform its next tripping operation when the work-clamp is again closed.

Figures 29, 30, 31, 32, 33, 34:
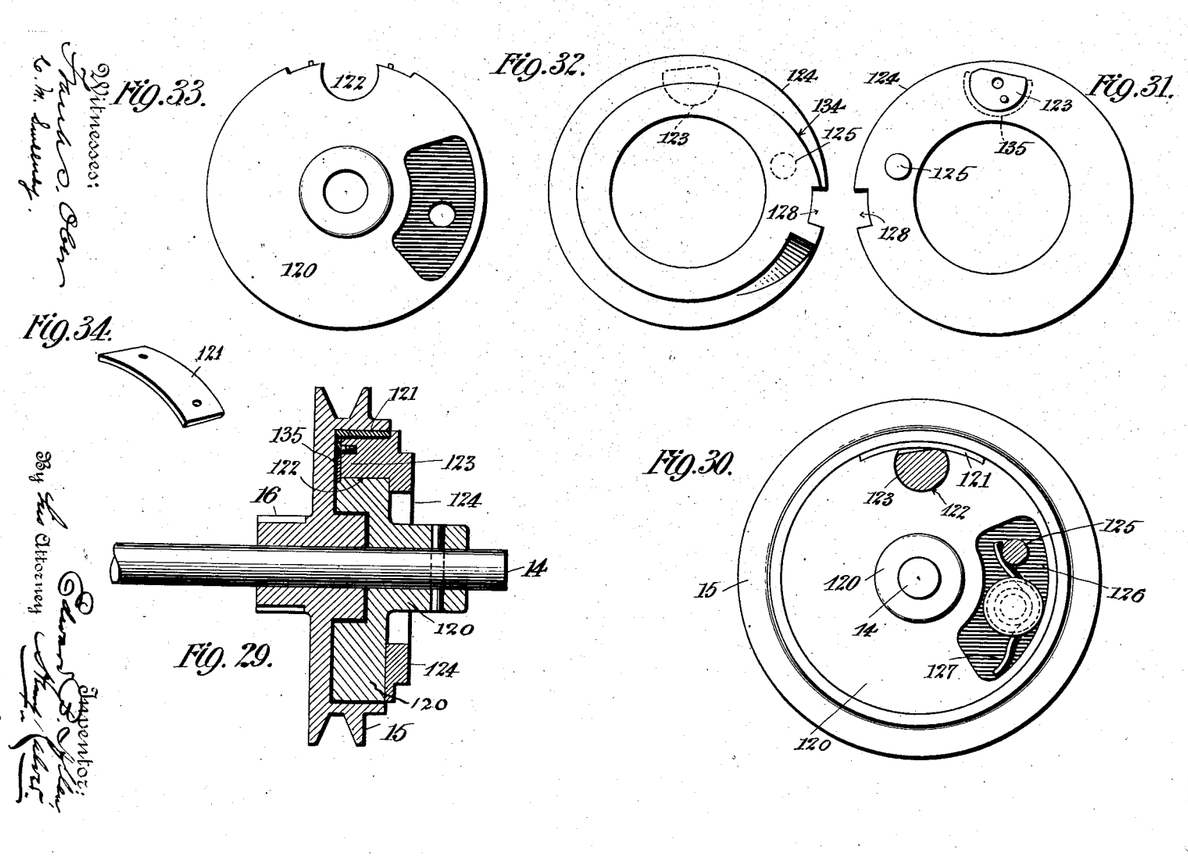
Figs. 29 to 34, inclusive, are detail views of the start- and stop-motion clutch-device.

The loose driving pulley 15, as hereinbefore stated, has a suitable clutch connection with the main or driving shaft 14, said clutch-connection, in the present instance, comprising a clutch-wheel or disk 120 which is pinned or otherwise attached to said shaft to rotate therewith, the said clutch wheel extending within said pulley which is suitably recessed or chambered for its reception. The clutch-wheel 120 is recessed at one portion of its periphery for the reception of a clutch-plate 121 interposed between said wheel and the wall of the chamber in the said loose pulley, said wheel also having a segmental recess 122, inside of said plate, for the reception of a cam projection 123 on a clutch-ring 124 which has a pivotal connection with the said clutch-wheel by means of said projection, so that the said clutch-ring may swing slightly relative to said clutch-wheel on said projection as a center or pivot, thus causing the cam or flattened outer portion of said projection to clamp said clutch-plate tightly against the wall of the chamber in the pulley 15 when the latter is to be connected to the driving shaft 14. The clutch-ring 124 is provided with a pin 125 extending within a recess 126 in the clutch-wheel 120 and which recess also receives a spring 127 bearing against said pin 125 so as to force the parts into the clutching position shown in Fig. 30. The said clutch-ring 124 is provided at its periphery with a notch 128 for the reception of a lug or projection 129 on a vertically movable block 130 carried by the stop-motion lever 131 pivotally mounted in a bracket 132 on the base or frame of the machine; a spring 133 housed in a recess in said lever serving to press said block yieldingly downward, and the said clutch-ring being provided with an eccentric or cam-portion 134 to engage said lug or projection 129 to lift the same so that it can fall into said notch 128, to swing said clutch-ring slightly in opposition to the stress of the spring 127, to release the said clutch-plate when the stop-motion lever has been tripped and the machine is to be stopped. The clutch-ring 124 is connected with the clutch-wheel 120 by a small plate 135 attached to the cam projection 123 and slightly overlapping the concentric circular portion of the latter circumferentially.

The work-clamp feeding cam-wheel 66 is provided with a tripping lug or projection 136 preferably carried by a plate 137 adjustably attached to said wheel; said lug or projection being arranged to engage the inner arm of a latch-lever 138 the outer arm of which is provided with a hook 139 to engage the stop-motion lever 131, when the machine is running, and prevent said lever from being moved to stopping position by its spring 140. A spring 141, acting on said latch-lever, normally presses said hook 139 towards said stop-motion lever, but when the inner arm of said latch-lever is engaged by said tripping lug or projection 136 the said hook will be disengaged from said stop-motion lever to release the latter so as to swing the stopping lug or projection 129, carried by said stop-motion lever, into position to engage the clutch-ring 124, and thus release the clutch, as hereinbefore indicated, for the stopping operation.

The stop-motion lever is provided with a friction pad 142, preferably of raw-hide or other suitable non-metallic material, which is arranged to be pressed into contact with the outer face of the clutch-ring 124 when the said stop-motion lever is first tripped, and thus retard the speed of rotation of the clutch-wheel prior to the final positive stop of said wheel and which positive stop occurs when the lug or projection 129 enters the notch 128 in the said clutch-ring.

The stop-motion lever 131 is pivotally mounted in the bracket 132 by means of a rock-shaft 143 to which said lever is rigidly attached, and the said rock-shaft is provided with a starting-arm 144 also rigidly attached to said shaft and carrying a pivoted dog 145 having an inclined inner face for engagement with the inclined outer face of a rigid projection 146 on the starting-lever 55. The said pivoted dog is provided with a lug 147 which is yieldingly pressed by a spring 148 against a stop-pin 149, and when the starting lever moves downward the said dog will yield or turn against the stress of said spring 148, and thus permit the rigid projection 146 on said starting-lever to pass by said dog without moving the starting arm 144; but when said starting lever is moved upward the incline on the said starting lever will engage the incline on the said dog (which is now held rigid by the said stop-pin 149) and thus force the starting-arm outward, such outward movement of said starting-arm swinging the lower arm of the stop-motion lever outward, thereby disengaging the lug or projection 129, carried by said arm, from the notch 128 in the clutch-ring 124 so as to allow the spring 127 to force the clutching parts into holding engagement with each other to set the machine in motion. As the lower arm of the stop-motion lever moves outward its upper arm moves inward so as to be engaged by the retaining hook of the latch-lever 138 which will then hold the said stop-motion lever in its inoperative position until the said latch-lever is again tripped by the lug or projection 136 on the feed wheel, at the completion of the next button-hole. During the time when the starting lever 55 is performing its downward and upward movements and before the clutching parts are engaged to set the stitch-forming and feeding mechanism of the machine into operation, the cutting device advances, cuts a button-hole and then retreats, as hereinbefore described, so as to be out of the way of the stitching mechanism by the time the latter is started.

In friction feeding devices for button-hole stitching machines it is common to provide a friction check which will prevent the feed-wheel or feed-shaft from overthrowing at high-speeds, so that the feed of the work, and the resulting spacing of the stitches, will be the same whether the machines be run at high or low speeds. In stitching eyed or eyelet-ended button-holes it is, however, desirable to increase the speed of rotation of the feed-wheel when the radiating stitches about the eyelet ends of the button-holes are being formed, to prevent improper crowding of such radiating stitches; and to this end it has been necessary, in many machines, to provide special and more or less complicated mechanisms for varying the feed when stitching the eyelet parts of the button-holes. In the present improved machine this result of increasing the feed, when forming the radiating stitches about the eyelet portions of the button-holes, is effected simply by an automatic release of the friction check which normally prevents the feed-wheel from overthrowing, so that an increase of feed will occur during the times when the stitch-forming devices are performing their rotating movements. To this end a friction block 150, arranged to be pressed against the periphery of the feed-wheel 64, is mounted in a holder 151 within which is also placed a somewhat stiff spring 152 which, when compressed, yieldingly forces said friction-block against said wheel. Pivoted to the base or frame of the machine is a bell-crank lever 153 the longer arm of which is provided with a stud entering a cam-groove 154 in the outer face of the feed-wheel 64, and the shorter arm of said lever carries an adjustable screw pin 155 projecting through a hole in the holder 151 so as to engage said spring 152 to compress the same against the friction block 150 during the times when the sides of the button-holes are being stitched; said lever being operated so that the pressure of the screw-pin 155 against said spring 152 is released when the radiating stitches about the eyes of the button-holes are being formed, and preferably also during the reverse rotation of the stitching devices when barring stitches are being made; the feed being very considerably greater (nearly double) when the pressure of the friction-block against the feed-wheel is relaxed by the proper releasing operation of said lever by said cam.

In the present improved machine in which the starting device is tripped when the work-clamp is closed, and also in which the cutting device is controlled by the starting device, the clamp should be held closed during a complete button-hole stitching operation, for the reason that if the clamp should be accidentally opened and again closed during such stitching operation the cutting device might be thrown into action and, by interfering with the stitching devices, might damage the latter. To guard against any such disastrous accident an automatic device for locking or holding the clamp closed during a stitching operation is provided. To this end the machine comprises a clamp locking lever 156 which is moved to and retained in locking position by a spring 157; and the feed wheel 64 is provided with a cam or projection 158 to engage the outer arm of said lever, to release it from locking position, when the stitching of a button-hole has been completed.

In the present instance the locking lever is so arranged that its inner end, when in locking position, is above and closely adjacent the collar 159 of a foot-piece 160 attached to a rod 161 connected to the tension-releasing lever 162, said foot-piece resting on a tension-releasing cam 163 on the work-clamp opening and closing rock-shaft 40; so that when the inner end of said locking lever is above said collar it will prevent said rock-shaft from being turned to open the clamp; but when the cam projection 158 on the feed-wheel engages the outer arm of said clamp locking lever the inner arm thereof will be withdrawn from above said collar and the clamp may then be opened. It will be understood, however, that the automatic clamp locking device might be differently constructed and arranged without departing from this feature of the invention.

If the button-holes are to be corded, to strengthen the same, a cord-guide to direct a cord to the work from beneath is preferably provided. The present machine comprises a cord-guide 164 carried by a block 165 pivotally mounted on a support 166 adjacent to the looper mechanism, said pivotally mounted block being preferably pressed against by a retaining spring 167 which serves to hold the cord-guide in working position; but as the said guide, when in such working position, can be threaded only with considerable difficulty it is pivotally mounted so that its inner end may be swung outward for threading, when this is necessary, and may then be swung back to its working position in which it will be held by the retaining spring 167.

In order that the coupling-lever 97, carried by the rear or operating arm 96 of the cutter-actuating rocker 95, may, when the said rocker is idle, be in such position that the tooth or projection 99 on said coupling lever will properly register with the notch 100 of the constantly vibrating cutter-operating lever 20, when the parts are to be coupled together for a cutting operation, an adjustable stop-pin 168, mounted in a bracket 169, is preferably provided. The said stop-pin is so arranged that the rear end of the arm 96 rests thereon when the parts are in uncoupled position, and said stop-pin is so adjusted that when the detent-lever 101 is released and the coupling-lever is moved to uncoupling position by its spring 98 the tooth or projection 99 will not fail to enter the notch 100 in the operating-lever 20 when the latter is at or near the bottom of its downward stroke.

The racks 81 and 82, which operate the pinions 28 and 30 which impart periodical turning movements to the needles and loopers, are preferably adjustably connected with the sliding rods 79 and 80 by which said racks are operated, and said racks are also preferably so mounted as to be slightly adjustable laterally relative to said pinions for the purpose of taking up wear. To this end the upper rack 81 is mounted to slide in a sleeve 170 rigid with a plate or arm 171 attached to the head of the machine, and which plate or arm 171 is provided with holes or slots 172 through which the shanks of the attaching screws 173 pass with sufficient looseness to permit the said plate or arm, and the sleeve 170 rigid therewith, to be adjusted slightly so as to move said sleeve towards said pinion when wear is to be taken up; the recess in the machine head, which receives said sleeve, being sufficiently large to permit of such adjustment of said sleeve. The rear end of the rod 174, on which the said rack 81 is formed, is notched on both sides to form a flattened portion embraced by a fork 175 rigid with a collar 176 adjustably attached to the sliding rod 79, so that the position of said collar on said rod may be varied to secure the proper timing or adjustment of the pinion 28, and of the needle-bar guide 27 to which said pinion is attached. Also the rod 177 on which the lower rack 82 is formed is notched on both sides at its rear end, similar to the rod 174, and the flattened portion of the said rod 177 is embraced by a fork 178 rigid with a collar 179 adjustably attached to the sliding rod 80, so that the timing or adjustment of the pinion 30, from which the turning movements of the looping devices are derived, may be readily effected by varying the position of the said collar 179 on said rod 80. The rack-rod 177 slides in a bearing plate or guide 180 having an adjustable tongue-and-groove connection, as at 181, with a support or block 182 rigid with the machine base, said plate having a slot or hole 183 through which the shank of its attaching screw loosely passes to permit the position of said plate to be varied slightly for the purpose of taking up wear between said rack 82 and said pinion 30.

Figures 11, 12, 13, 14, 15:
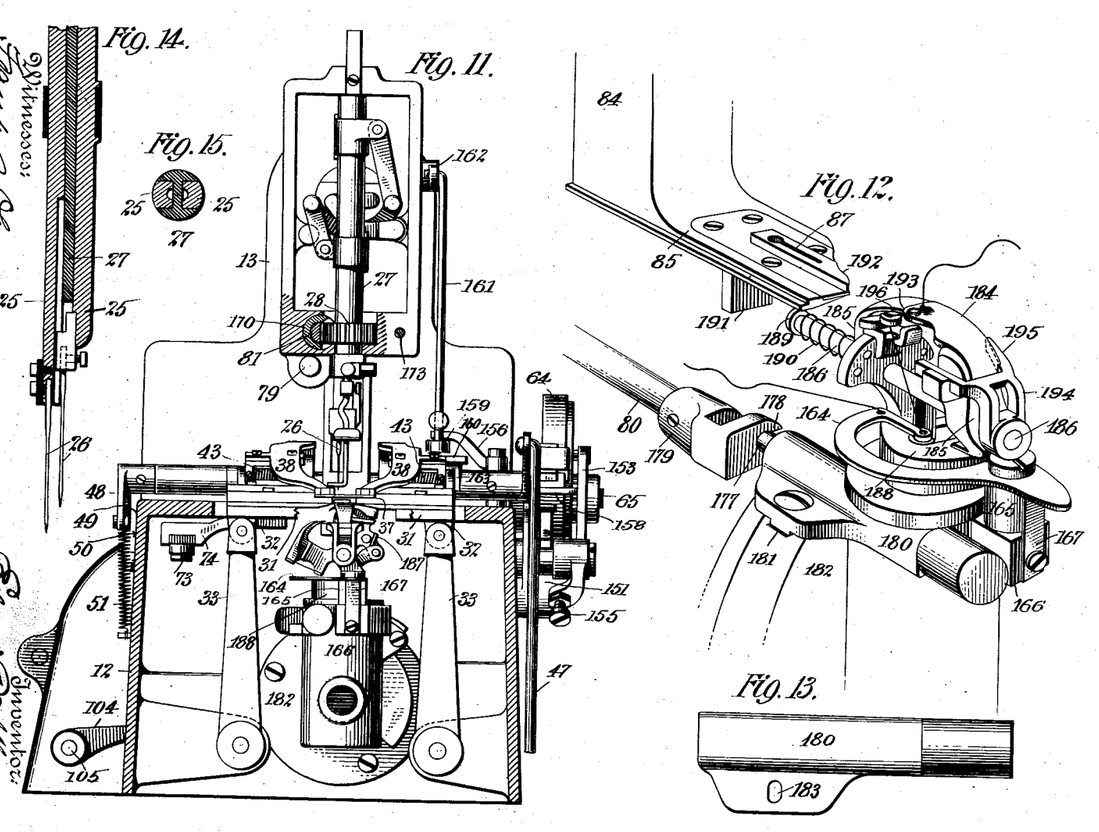
Fig. 11 is a front end view, with the face-plate of the head removed and with the front end of the machine base in section.
Fig. 12 is a detail perspective view to show the tilting throat-plate mechanism and the swinging cord-guide.
Fig. 13 is a detail plan view of the bearing or guide for the lower sliding rack.
Figs. 14 and 15 are detail views of the needle-bar mechanism.
Figures 16, 17, 18:
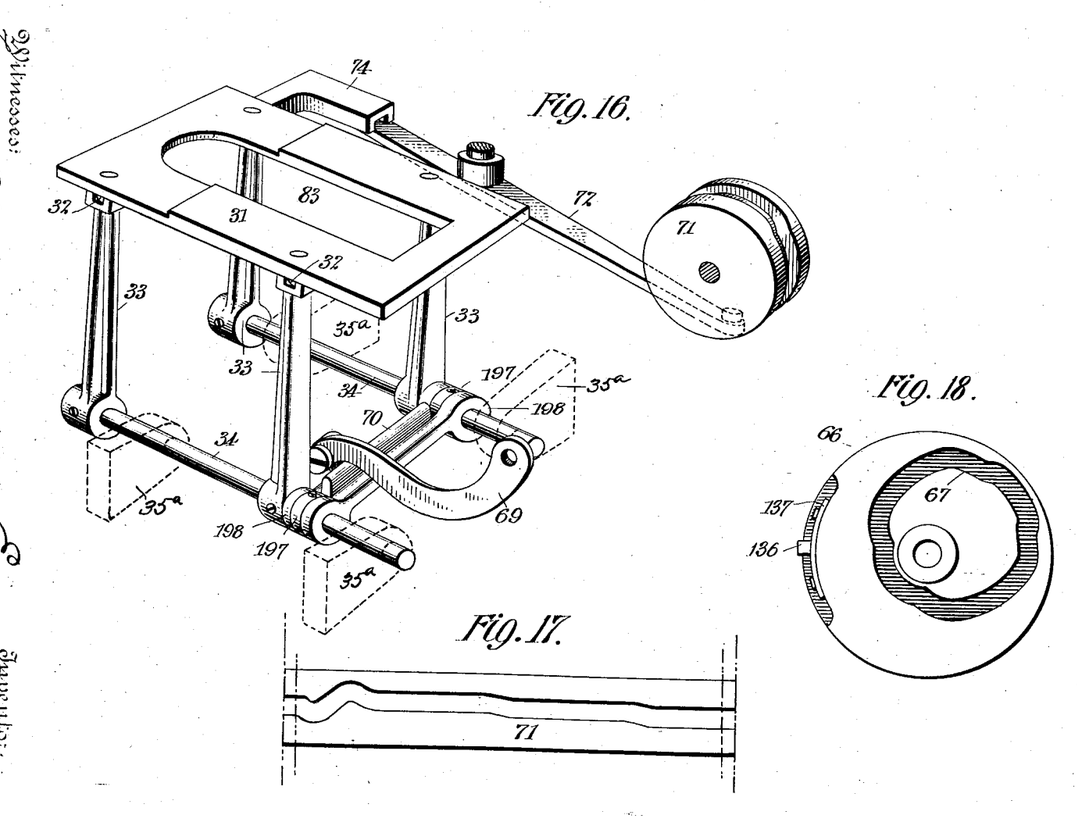
Fig. 16 is a detail perspective view of the work-support and part of its operating mechanism.
Fig. 17 is a diagram or projection of the cam which swings the work-support laterally.
Fig. 18 is a detail view of the feed-cam.

To permit the button-holes to be cut when the work is in stitching position, and without necessitating removing the looping devices from working position, a tilting needle throat-plate 184, movable independently of said looping devices, is employed. The said throat-plate, in the form of the invention herein shown, is provided with downwardly depending ears 185 by which it is pivotally supported on a sliding pin 186 which also serves as the pivot pin of the rocking looper-carrier 187;
said pin being supported in suitable bearings in the rotatable support 188 for the said looper-carrier. The sliding pivot-pin 186 is provided with a head or collar 189 between which and one of the said ears 185 is interposed a coil-spring 190. The traveling cutting device carries an abutment-lug 191 adapted to come in contact with the sliding pivot-pin 186 when the said cutting device is moved forward to cutting position; and the foot-plate 85 of the said cutting device is provided with an incline 192 arranged to engage a suitable part of the throat-plate, as the rounded projection 193 thereon, for the purpose of tilting the said throat-plate out of the way of said foot-plate when the cutting device is advanced to cutting position. Attached to and thus movable with the sliding pivot-pin 186 is a carrier 194 which is provided with a locking-arm 195 which normally engages the throat-plate and retains the same in working position, but when said pivot-pin is moved forward against the stress of the spring 190, by the projection or abutment lug 191 carried by the cutting device, the said locking arm is also moved forward. The said locking-arm 195 is provided with an inclined inner face contacting with a correspondingly inclined face or part on the throat-plate 184; so that as said locking-arm is moved forward with the advancing cutting device sufficient clearance will be afforded to permit the throat-plate to tilt over sidewise, and thus the cutting device can come far enough forward to cut a button-hole in stitching position, or with the small end of the button-hole slit beneath the needles. When the cutting device is retracted the spring 190 also retracts the sliding-pin 186 and thus causes the inclined face on the locking-arm 195 to restore the tilting-throat-plate to working position and to lock it in such position against accidental displacement; thereby avoiding any danger of breaking the needles by improper contact with the said throat-plate. When the cutting device moves forward to cutting position the foot-plate 85 thereof travels above a small open cord-guiding eye 196 which coöperates, in guiding the cord, with the movable cord-guide 164, as will be readily understood from the perspective view, Fig. 12.

The side-swinging work-support or table 31, on which the work-clamp is mounted, is an important feature of the improved machine, in that it affords a construction in which the lateral movements of the work may be effected with the greatest ease and without appreciable friction; while the entire traveling work-supporting frame is light and strong and is movable lengthwise of the button-holes with very little friction, as the rocking and sliding rods 34 move very easily in their bearing lugs or supports 35ª. To permit the said rods to rock freely relative to the cross-bar 70, to which the operating pitman 69 is attached, the said cross-bar is forked at its ends to embrace collars 197 which are secured to and rock with said rods; while the latter are free to rock in the forks 198 of said bar.

The entire longitudinally movable and laterally swinging work-supporting frame, while light and strong and easily operable, is also of such construction that it may be made at a low cost, thus combining ease and efficiency of operation with economy in making. The manual closing of the work-clamp of the present improved machine enables the operator to partially depress the upper member into close proximity with the material, so as to bring its central aperture close to the face of the material, for final adjustment of the work, before actually clamping the goods in position. This permits the operator to accurately locate the buttonhole in the required position before the machine is started for the cutting and stitching operation, and permits any slight shifting of the work that may be required to properly position the same, when the upper member of the clamp is in the most favorable position therefor; to wit, that of light contact with the face of the work, without being in actual clamping relation therewith. The clamp-closing device of the present improved machine is therefore especially adapted for such shifting operation, as the actual starting of the machine, constructed as herein shown and described, does not take place until the clamp is fully closed upon the goods; but with a starting device permitting less lost-motion the manual closing of the clamp would be desirable, in a greater or less degree, for the reasons above indicated.

In a button-hole machine in which the work-clamp is closed automatically or instantaneously no opportunity is afforded to the operator for final adjustment of the work, to properly position the buttonhole, between the initial wide-open position of the clamp and the closed position thereof, the operator being required to locate the button-hole with the upper member of the clamp fully lifted. Also the locking of the work-clamp upon the work of the present improved machine, during the whole cycle of operations of the machine necessary to complete a buttonhole, prevents an inadvertent premature opening of the clamp and subsequent closing thereof with a consequent second cutting operation, which would be liable to result in injury to the work and also injury to the still operating stitching mechanism during the normal period of operation of the latter. Also the independent actuation of the cutting and stitch-forming mechanisms from a single starting member, in conjunction with the mechanism for rapidly shifting the cutting members to and from their operative position, involves a considerable saving of time in the production of a buttonhole. As the machine is actually timed, it is not necessary that the cutter should be retracted to initial inoperative position before the stitch-forming mechanism begins its operation, but the latter starts to operate just as soon as the cutting members have been withdrawn sufficiently to prevent interference, and while they are still making their retractive movements; the projection 146 carried by the starting-lever 55 engaging the dog 145 carried by the starting-lever 144 at the beginning of the rising movement of the starting-lever 55.

I do not herein broadly claim the improvements in the work-holding and feeding mechanism, the start- and stop-motion mechanism, and the stitch-forming mechanism herein described and shown, these features of my invention being, respectively, embraced by my applications, Nos. 341,201; 341,202 and 341,203, filed Oct. 30, 1906, as divisions of this case.

It will of course be understood that the present invention is not limited to the details herein shown and described, as such details may be varied widely without departing from the spirit of the invention.

Having thus described my invention I claim and desire to secure by Letters Patent:

1. In a button-hole stitching machine, the combination with a stationary frame or support, of stitch-forming devices mounted thereon, a traveling work-clamp also mounted on said frame or support, an automatic button-hole cutting device comprising connected upper and lower cutting members movable together towards and from said stitch-forming devices, and automatic operating means for moving said cutting device towards and from said stitch-forming devices and for effecting the cutting operations.

2. In a button-hole stitching machine, the combination with a stationary frame or support, of turning stitch-forming devices mounted thereon, means for imparting periodical rotating movements to said stitch-forming devices, a traveling work-clamp also mounted on said frame or support, a button-hole cutting-device comprising upper and lower connected members movable together towards and from said stitch-forming devices, and automatic operating means for moving said cutting device into and out of cutting position and for operating the cutter.

3. In a button-hole stitching machine, the combination with a stationary frame or support, of stitch-forming and work-holding devices mounted thereon, a movable throat-plate, a button-hole cutting-device movable on said stationary frame or support towards and from said stitch-forming devices, means, movable with said cutting device, for displacing said throat-plate from working position when said cutting device is advanced to cut a button-hole, and means for operating said cutting device.

4. In a button-hole stitching machine, the combination with a stationary frame or support, of stitch-forming and work-holding devices mounted thereon, a movable throat-plate, a button-hole cutting-device movable on said stationary frame or support towards and from said stitch-forming devices, means, movable with said cutting device, for displacing said throat-plate from working position when said cutting device is advanced to cut a button-hole, means for operating said cutting device, and means for locking said throat-plate in working position.

5. In a button-hole stitching machine, the combination with a stationary frame or support, of stitch-forming and work-holding devices mounted thereon, a movable throat-plate, a button-hole cutting-device movable on said stationary frame or support towards and from said stitch-forming devices, means, movable with said cutting device, for displacing said throat-plate from working position when said cutting device is advanced to cut a button-hole, means for operating said cutting device, means for locking said throat-plate in working position, and means for unlocking said throat-plate when the cutting device moves forward to perform a cutting operation.

6. In a button-hole cutting and stitching machine, the combination with stitch-forming, work-holding, and button-hole cutting devices, of a movable needle throat-plate, means for displacing said throat-plate from working position when a button-hole is to be cut, and means for locking said throat-plate in working position.

7. In a button-hole cutting and stitching machine, the combination with work-holding and button-hole cutting devices, of turning stitch-forming devices, a movable needle throat-plate, means for locking said throat-plate in working position, means for removing said throat-plate from working position when a button-hole is to be cut, and for returning said throat-plate to working position, and means for imparting periodical rotary or turning movements to said stitch-forming devices.

8. In a button-hole stitching machine, the combination with a stationary frame, of stitch-forming devices mounted thereon, a button-hole cutting device also mounted on said frame and movable towards and from said stitch-forming devices, a laterally swinging and longitudinally reciprocating work-support also mounted on said frame, a work-clamp mounted on and movable with said work-support, and means for swinging said work-support laterally and for feeding it longitudinally.

9. In a button-hole stitching machine, the combination with a stationary frame, of turning stitch-forming devices mounted thereon, a button-hole cutting device also mounted on said frame and movable towards and from said stitch-forming devices, a laterally swinging and longitudinally reciprocating work-support also mounted on said frame, a work-clamp mounted on and movable with said work-support, means for swinging said work-support laterally and for feeding it longitudinally, and means for imparting periodical rotating or turning movements to said stitch-forming devices.

10. In a buttonhole stitching machine, the combination with stitch-forming devices, a work-clamp, and manually operated means for closing said clamp, of a button-hole cutting device, actuating means for said cutting device, connections between said work-clamp and said actuating means whereby the manual act of closing the clamp will set said actuating means into operation to cut a button-hole, and automatic means for positively locking said clamp in closed position during the stitching of a button-hole and for releasing the clamp locking device when the stitching of a button-hole has been completed, so that said clamp cannot be accidentally opened at an improper time to cause an untimely connection of the button-hole cutting device with its actuating mechanism.

11. In a buttonhole stitching machine, the combination with stitch-forming devices, of a starting device for said stitch-forming devices, a work-clamp, manually-operated means for closing the said clamp and for controlling said starting device to throw said stitch-forming mechanism into operation, a buttonhole cutting device, means for actuating said cutting device, and automatic means, controlled by said starting device, for setting said cutting device into operation.

12. In a button-hole stitching-machine, the combination with stitch-forming devices, of a work-clamp, manually operated means for closing the said clamp, a button-hole cutting device, a starting device for the said stitch-forming mechanism, means for actuating said cutting device, connections between said work-clamp and said starting device whereby the latter will be tripped to start the said stitch-forming devices into operation by the manual act of closing the clamp, an automatic means, controlled by said starting device, for setting the said cutting device into operation.

13. In a button-hole stitching-machine, the combination with stitch-forming devices, of a work-clamp, manually operated means for closing the said clamp, a button-hole cutting device, a starting device for the said stitch-forming mechanism, means, comprising a constantly running part, for actuating said cutting device, connections between said work-clamp and said starting device whereby the latter will be tripped to start the said stitch-forming devices into operation by the manual act of closing the clamp, and automatic means, controlled by said starting device, for coupling said cutting device with said constantly running part for the purpose of setting the said cutting device into operation.

14. In a button-hole stitching machine, the combination with stitch-forming devices, of a work-clamp, a button-hole cutting device, a starting device for the said stitch-forming devices, means for actuating said cutting device, connections between said work-clamp and said starting device whereby the latter will be tripped to start the said stitch-forming devices into operation by the act of closing the clamp, said connections comprising a tripping bar, a clamp opening and closing shaft with which said bar is connected, and a tripping-lever which normally retains said starting device in an inoperative position, and means, controlled by said starting device, for setting the said cutting device into operation.

15. In a button-hole stitching-machine, the combination with stitch-forming and button-hole cutting devices, of a continuously-rotating wheel having a recessed part provided with an open mouth, a spring-pressed switch-tappet in said recessed part, a starting-lever having a stud to enter the cam-track in said recessed part afforded by the said switch-tappet, retaining and tripping means for said starting lever, a start- and stop-motion device adapted to be tripped, to set the machine running, by said starting lever, a cam rotating with said wheel, and means, actuated from said cam, for operating said cutting devices.

16. In a button-hole stitching machine, the combination with stitch-forming and button-hole cutting devices, of a continuously rotating wheel having a recessed part provided with an open mouth, a spring-pressed switch-tappet in said recessed part, a starting-lever having a stud to enter the cam-track in said recessed part afforded by the said switch-tappet, retaining and tripping means for said starting lever, a start- and stop-motion device adapted to be tripped, to set the machine running, by said starting-lever, said wheel being provided on its side opposite said switch-tappet with a cam, a continuously-vibrating lever operated by said cam, and automatic means for operatively connecting said cutting device with said continuously-vibrating lever when a cutting operation is to be performed.

17. In a button-hole stitching-machine, the combination with stitch-forming and button-hole cutting devices, of a continuously-rotating wheel having a recessed part provided with an open mouth, a spring-pressed switch-tappet in said recessed part, a starting-lever having a stud to enter the cam-track in said recessed part afforded by the said switch-tappet, retaining and tripping means for said starting lever, a start- and stop-motion device adapted to be tripped, to set the machine running, by said starting lever, said wheel being provided on its side opposite said switch-tappet with a cam, a continuously-vibrating lever operated by said cam, automatic means for operatively connecting said cutting device with said continuously-vibrating lever when a cutting operation is to be performed, and a work-clamp and connections whereby when said work-clamp is closed said starting lever will be released.

18. In a button-hole stitching machine, the combination with stitch-forming and button-hole cutting mechanisms, of a continuously-rotating wheel having a recessed part provided with an open mouth, a spring-pressed switch-tappet in said recessed part, and means, controlled by said switch-tappet for setting said cutting mechanism into operation when a button-hole is to be cut.

19. In a button-hole stitching machine, the combination with a stitch-forming mechanism, a button-hole cutting device, and a start- and stop-motion device, of a continuously-running wheel having a recessed part provided with an open mouth, a spring-pressed switch-tappet in said recessed part, and means, controlled by said switch-tappet, for actuating said cutting device and for operating said start- and stop-motion device to set said stitch-forming mechanism into action.

20. In a button-hole stitching-machine, the combination with a stitch-forming mechanism, of a start- and stop-motion mechanism for said stitch-forming mechanism comprising a starting-lever having a pin or stud, a continuously-rotating spring-pressed switch-tappet, controlling means whereby said pin or stud may be operatively engaged with said switch-tappet when said stitch-forming mechanism is to be set into operation, and a button-hole cutting mechanism also controlled by said starting lever.

21. In a button-hole stitching-machine, the combination with a stitch-forming mechanism, of a start- and stop-motion mechanism for said stitch-forming mechanism comprising a starting-lever having a pin or stud, a continuously-rotating spring-pressed switch-tappet, controlling means whereby said pin or stud may be operatively engaged with said switch-tappet when said stitch-forming mechanism is to be set into operation, a button-hole cutting device, an operating mechanism for said device comprising a coupling lever controlled by said starting-lever, and a constantly-vibrating lever to which said coupling is operatively connected when a button-hole is to be cut.

In testimony whereof I affix my signature, in presence of two witnesses.

EDWARD B. ALLEN.

Witnesses:
HENRY J. MILLER,
HENRY A. KORNEMANN.